(12) United States Patent
Wang et al.

(10) Patent No.: US 8,184,541 B2
(45) Date of Patent: May 22, 2012

(54) METHOD AND SYSTEM FOR LINK LAYER SCHEDULING IN A MULTIPLE ACCESS COMMUNICATION SYSTEM

(75) Inventors: Chao-Chun Wang, Taipei (TW); Chih-Shi Yee, Baoshan Township, Hsinchu County (TW); Shao Wei Chen, Yonghe (TW)

(73) Assignee: Mediatek Inc. (TW)

( * ) Notice: Subject to any disclaimer, the term of this patent is extended or adjusted under 35 U.S.C. 154(b) by 343 days.

(21) Appl. No.: 12/319,690

(22) Filed: Jan. 9, 2009

(65) Prior Publication Data
US 2009/0122708 A1    May 14, 2009

Related U.S. Application Data

(60) Provisional application No. 61/083,188, filed on Jul. 24, 2008.

(51) Int. Cl.
*G01R 31/08* (2006.01)
*H04J 1/16* (2006.01)

(52) U.S. Cl. ............... 370/236; 370/231; 370/235
(58) Field of Classification Search ............ 370/231, 370/235, 236
See application file for complete search history.

(56) References Cited

U.S. PATENT DOCUMENTS

| | | | |
|---|---|---|---|
| 7,468,947 B2 * | 12/2008 | Mannal et al. | 370/236 |
| 7,477,621 B1 * | 1/2009 | Loc et al. | 370/329 |
| 2002/0105970 A1 * | 8/2002 | Shvodian | 370/468 |
| 2005/0003856 A1 * | 1/2005 | Jang et al. | 455/553.1 |
| 2007/0070901 A1 * | 3/2007 | Aloni et al. | 370/230 |
| 2008/0062867 A1 * | 3/2008 | Lee et al. | 370/230 |
| 2008/0267070 A1 * | 10/2008 | Mannal et al. | 370/235 |
| 2009/0019162 A1 * | 1/2009 | Riddle | 709/226 |
| 2009/0052463 A1 * | 2/2009 | Chen et al. | 370/406 |

OTHER PUBLICATIONS

R. Chakravorty et al., "Flow Aggregation for Enhanced TCP over Wide-Area Wireless," IEEE Infocom, 2003.
B. Beser et al., "Proposal for MAC protocol Modification for 802.16.3 Application," IEEE 802.16.3c-01/24, Jan. 18, 2001.

* cited by examiner

*Primary Examiner* — Ricky Ngo
*Assistant Examiner* — Paul H Masur
(74) *Attorney, Agent, or Firm* — Imperium Patent Works; Zheng Jin

(57) ABSTRACT

A method and system is provided for link layer scheduling for networked applications in a coordinator-based communications system. A network-coordinating device receives a request from a networked application to establish a communications session. The request includes a set of session parameters. The network-coordinating device allocates a first transmission opportunity in response to the request. The network-coordinating device allocates successive transmission opportunities based on the set of session parameters without receiving successive requests. The set of session parameters comprises at least one of a predetermined flow control mechanism, a quality-of-service (QoS) requirement, a bandwidth requirement, and an application type. In one embodiment, the predetermined flow control mechanism is additive increase and multiplicative decrease (AIMD) of transmission control protocol (TCP). Using the novel link layer scheduling, the network-coordinating device is able to allocate and adjust successive transmission opportunities to match the upper-layer resource requirement and traffic pattern dynamically.

20 Claims, 6 Drawing Sheets

METHOD AND SYSTEM FOR LINK LAYER SCHEDULING IN A MULTIPLE ACCESS COMMUNICATION SYSTEM

CROSS REFERENCE TO RELATED APPLICATIONS

This application claims priority under 35 U.S.C. §119 from U.S. Provisional Application No. 61/083,188, entitled "A Method and System for Allocating Link Layer Transmission Opportunities for Networked Applications," filed on Jul. 24, 2008, the subject matter of which is incorporated herein by reference.

TECHNICAL FIELD

The disclosed embodiments relate generally to communications systems and networked applications, and, more particularly, to link layer scheduling for multiple access communications systems.

BACKGROUND

A communications system employs at least one physical communications link that provides means for networked applications to exchange data. A communications link is either a wired link or a wireless link defined by a set of parameters. For example, the communications link may be defined by the bandwidth, delay, jitter, packet/cell error rate, or packet/cell loss rate in order to support Quality of Service (QoS) requirement for networked applications. Networked applications exchange data over a communications link in accordance with a communications protocol. A communications protocol comprises a handshake procedure and a flow control mechanism that regulates the data exchange. To facilitate multiple users and networked applications to exchange data over the physical communications link, various Media-Access-Control (MAC) protocols are defined in accordance with the requirement of networked applications and channel characteristics of the physical link.

Based on the type of multi-access protocol used, a communications system can be categorized into two basic types. One is a contention-based multiple access communications system. The other is a coordinator-based multiple access communications system. In a contention-based network, network devices listen to the media, and transmit data when the media is free and clear of signals. Typical example of a contention-based network is the Ethernet that employs Carrier Sense Multiple Access (CSMA) protocol. A contention-based network cannot guarantee the Quality of Service requirement for networked applications. In a coordinator-based network, a network-coordinating device reserves bandwidth required by each networked application. An example of a coordinator-based network is the IEEE 802.16e network, in which the subscriber station (SS) cannot transmit data until it has been allocated a channel by the Base Station (BS). This allows the 802.16e to provide stronger support for QoS.

FIG. 1 (Prior Art) illustrates a link layer procedure for an asynchronous communication service in a coordinator-based network. A synchronized communication service such as IP television, streaming video or video conferencing requires real-time streaming media. For asynchronous communications service such as file transfer, email, or Internet browsers, on the other hand, the application does not require a constant bit rate. Instead, a variable or burst transmission rate is required from the application by making an on-demand bandwidth request to the network-coordinating device.

In the example of FIG. 1, device A sends a bandwidth request #1 to coordinating device C when it needs to send data to device B. Coordinating device C receives request #1 and in response sends grant #1 to device A. Device A then starts to transmit data after it receives grant #1. Finally, device B sends an acknowledgement (ACK) back to device A after it receives data successfully. Later on, when device A needs to send data to device B again, the same procedure is repeated. Device A starts to transmit data only after it has sent a request #2 to coordinating device C and has received a grant #2 back from coordinating device C. Therefore, this request-and-grant link layer protocol introduces extra latency because device A needs to make a request and then wait for a grant every time before it is able to transmit any data. In addition, the coordinating device lacks information to make more intelligent grant decisions. It remains a challenge to improve the intelligence of the network-coordinating device such that it can make dynamic grant decisions to facilitate upper layer flow control based on application requirements and network conditions.

SUMMARY

A method and system is provided for link layer scheduling for networked applications in a coordinator-based communications system. A network-coordinating device receives an initial request from a networked application to establish a communications session. The initial request includes a set of session parameters. The network-coordinating device allocates a first transmission opportunity in response to the initial request. The network-coordinating device allocates successive transmission opportunities based on the set of session parameters without receiving successive requests. The set of session parameters comprises at least one of a predetermined flow control mechanism, a quality-of-service (QoS) requirement, a bandwidth requirement, and an application type. Using this novel link layer scheduling, the network-coordinating device is able to allocate and adjust successive transmission opportunities to match the upper-layer resource requirement and traffic pattern dynamically.

In a Time Division Multiple Access (TDMA)-based communications system, the transmission opportunity is equivalent to one or more transmission time slots. By allocating more time slots, more bandwidth is reserved for a network device to communicate with another network device. In one example, the predetermined flow control mechanism is additive increase and multiplicative decrease (AIMD) of transmission control protocol (TCP). The coordinating device matches the AIMD principle in allocating successive transmission time slots when the session parameter indicates that TCP is used as the transport layer protocol. The coordinating device addictively increases the number of transmission time slots by one when no congestion occurs and multiplicatively decreases the number of transmission time slots by half when congestion occurs. As a result, by matching the link layer scheduling method to the upper transport layer AIMD principle, the coordinating device is able to better estimate the upper-layer resource requirement and traffic pattern and allocate transmission opportunities dynamically and more efficiently.

In one embodiment, the coordinating device may change successive allocations dynamically if it is notified by a network device that network congestion has occurred or certain data has lost during transmission. For example, if a network device missed an ACK, then the network device may send a notification to the coordinating device. In response, the coordinating device reduces the number of time slots in the next grant. In another embodiment, the coordinating device changes successive allocations dynamically based on utilization of previous allocated time slots. If over-allocation is detected, then the coordinating device reduces the number of time slots in successive grants; and if under-allocation is detected, then the coordinating device increases the number of time slots in successive grants. By adjusting the allocation of transmission time slots dynamically based on network conditions and utilization of previous allocated time slots, system resource can be more efficiently utilized in the network.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
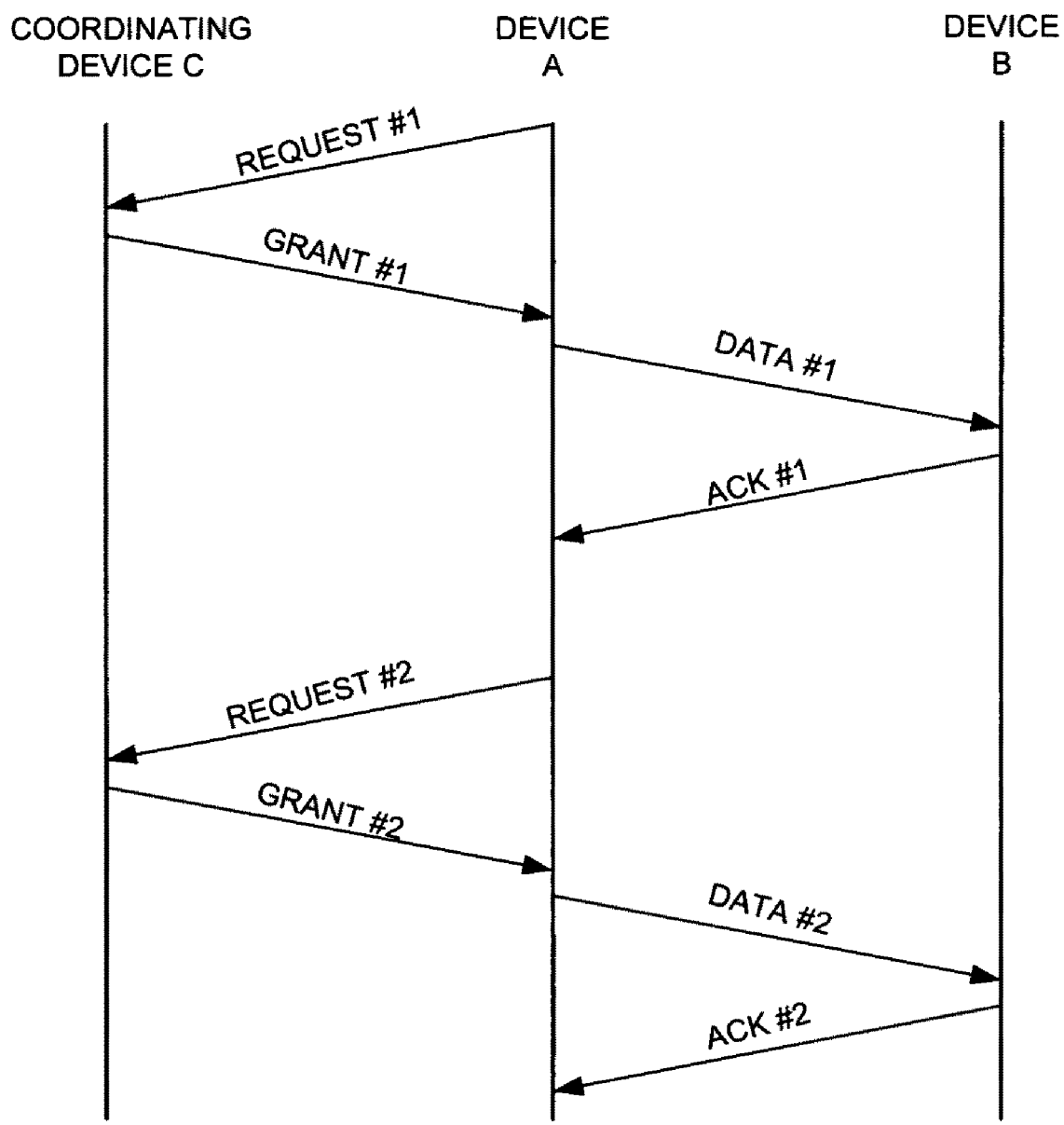
FIG. 1 (Prior Art) illustrates a data exchange procedure for an asynchronous communication service in a coordinator-based network.
Figure 2:
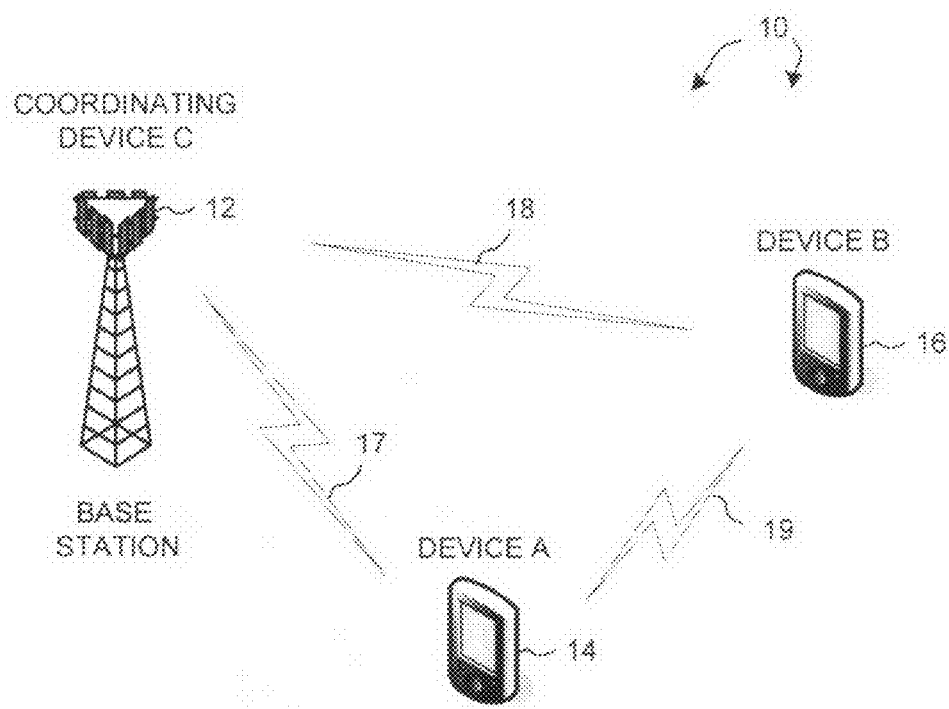
FIG. 2 is a system architecture diagram of a coordinator-based wireless network in accordance with one novel aspect.

FIG. 2 is a system architecture diagram of a coordinator-based wireless network 10 in accordance with one novel aspect. Coordinator-based network 10 includes three devices: a link layer network-coordinating device 12 (device C), a first communications device 14 (device A), and a second communications device 16 (device B). In the example of FIG. 2, the devices communicate through wireless communications links 17, 18 and 19 respectively. Coordinator-based network 10 of FIG. 2 is a multiple access communications system. Coordinating device C provides link layer scheduling and coordination in allocating communications resource such that multiple devices in network 10 are able to communicate with each other. The communications resource is a transmission opportunity that includes a specific transmission time slot and/or a specific frequency channel depending on the type of multi-access protocol (such as TDMA or FDMA) used. In a TDMA-based communications system, a transmission opportunity comprises one or more transmission time slots. By allocating more time slots, more bandwidth is allocated for a network device to communicate with another network device. For example, when device A sends a bandwidth request to coordinating device C, coordinating device C allocates a number of transmission time slots to device A in response to the bandwidth request.

Figure 3:
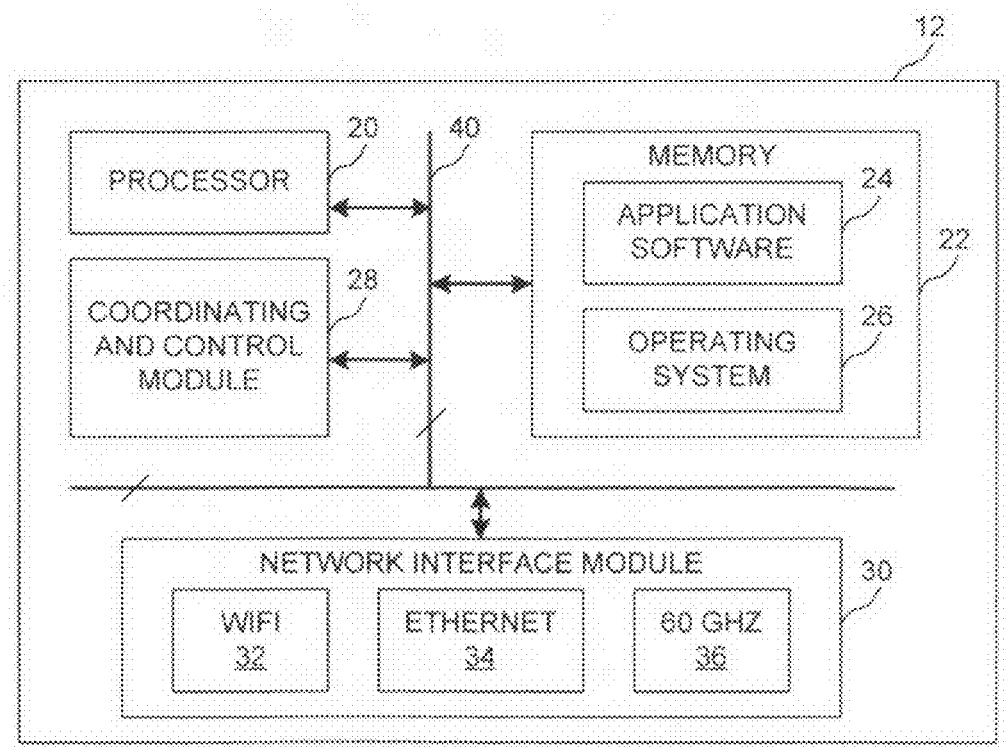
FIG. 3 is a simplified block diagram of a network-coordinating device in a coordinator-based network of FIG. 2.

FIG. 3 is a simplified block diagram of link layer coordinating device C in coordinator-based network 10 of FIG. 2. Coordinating device C includes a processor 20, a memory 22 that stores an application software module 24 and operating system module 26, a coordinating and control module 28, a network interface module 30, and a data bus 40. Processor 20 executes instructions from software module 24 and operating system module 26 through data bus 40. Network interface module 30 enables network devices to communicate with each other either by a wired or wireless communications link. In the example of FIG. 3, network interface module 30 includes a Wi-Fi (IEEE 802.11) interface module 32, an Ethernet interface module 34, and a 60 GHZ interface module 36. Based on the Open System Interconnection (OSI) network model, network interface module 30 typically comprises OSI layer 1 (physical layer) and layer 2 (data link layer) functions, as it provides physical access to a network medium and provides a low-level addressing scheme through the use of MAC addresses. Coordinating and control module 28 interacts with both link layer and upper layer and performs coordination and control functions. For example, coordinating and control module 28 may include a link layer scheduler that receives bandwidth requests from other network devices in the network and sends out grants in response to the bandwidth requests. Operation system 26 typically includes both an OSI layer 3 (network layer) and layer 4 (transport layer) software modules. For example, operating system 26 may support the TCP/IP protocol stack. Application software module 24 typically includes applications composed of upper three OSI layers 5, 6 and 7 (presentation, session, and application layer) functions. For example, application software module 24 may support networked applications such as remote login, file transfer, email, the WWW, and other asynchronous communications services.

Figure 4:
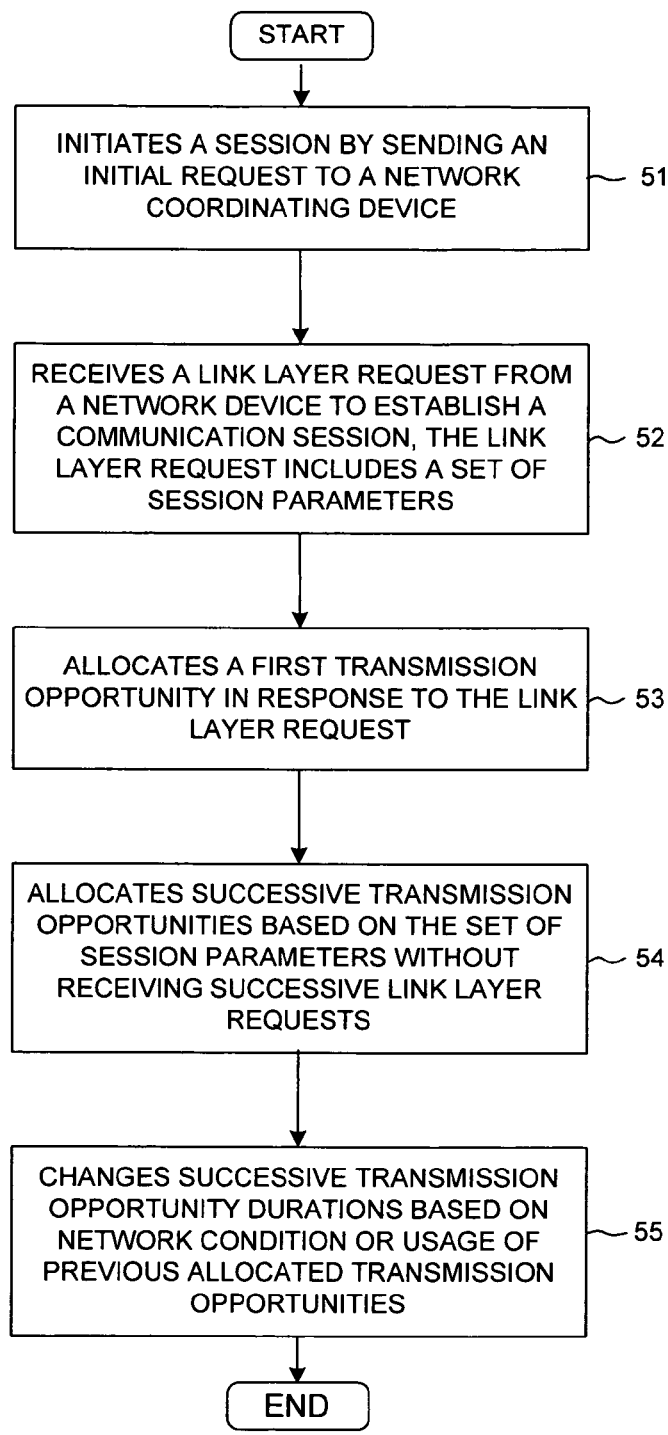
FIG. 4 is a flow chart of a method of link layer scheduling in accordance with one novel aspect.

FIG. 4 is a flow chart of a method of link layer scheduling in accordance with one novel aspect. In a coordinator-based, multiple access communications system, a network-coordinating device allocates system resource based on requests received from network devices in the communications system. When a networked application on device A wants to communicate data with another device B, device A establishes a communications session and sends an initial link layer request to the network-coordinating device (step 51). The network-coordinating device receives the initial link layer request, which includes a set of session parameters (step 52). In response, the network-coordinating device allocates a first transmission opportunity to device A (step 53). Next, based on the set of session parameters, the network-coordinating device dynamically allocates successive transmission opportunities to device A without receiving successive link layer requests from device A (step 54). Finally, the network-coordinating device changes successive transmission opportunity durations either based on network conditions or based on usage of previous allocated transmission opportunities (step 55). The network condition and usage of previous allocated transmission opportunities can either be detected by the network-coordinating device or be notified by a network device in the coordinator-based communications system.

Figure 5:
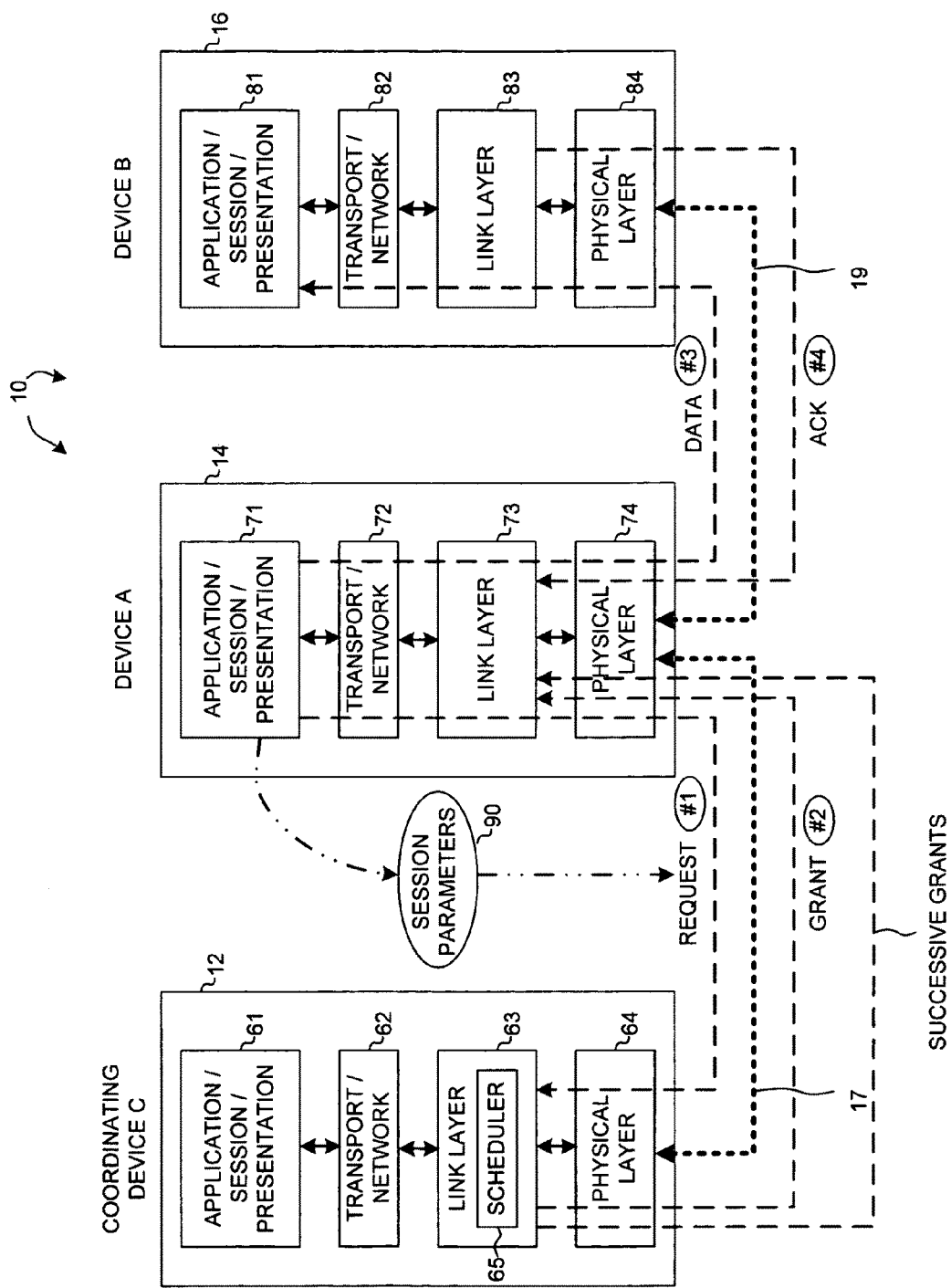
FIG. 5 is a diagram that illustrates a method of link layer scheduling in a coordinator-based network in accordance with the flow chart of FIG. 4.

FIG. 5 is a diagram that illustrates a method of link layer scheduling in coordinator-based network 10 of FIG. 2 in accordance with the flow chart of FIG. 4. The block diagrams of devices A, B, and C in FIG. 5 are shown with a layered architecture according to the OSI model. Under the OSI model, each device (e.g., device A, B, and C) includes a physical layer (e.g., 64, 74 and 84), a data link layer (e.g., 63, 73 and 83), a transport/ network layer (e.g., 62, 72 and 82), and an application/session/presentation layer (e.g., 61, 71 and 81), respectively. Physical layer 74 of device A is connected to physical layer 64 of coordinating device C through wireless communications link 17, and is connected to physical layer 84 of device B through wireless communications link 19. Link layer 63 of network-coordinating device C comprises a link layer scheduler 65 responsible for handling bandwidth requests from each device and in response allocating transmission opportunities to each device in coordinator-based network 10.

In the example of FIG. 5, a communications session is established between network device A and network device B by a networked application using a communications protocol. In addition, the communications protocol also transmits an initial bandwidth request (request #1) to link layer scheduler 65 of coordinating device C. Link layer scheduler 65 receives request #1 and determines one or more transmission opportunities accordingly. Link layer scheduler 65 transmits a grant #2 describing the one or more transmission opportunities back to network device A. After device A receives grant #2 from coordinating device C, device A sends data #3 to device B during the one or more allocated transmission opportunities. After device B receives data #3 from device A, device B sends an acknowledgment packet, ACK #4, back to device A.

As illustrated in FIG. 5, the initial request #1 contains a set of session parameters 90. The set of session parameters 90 typically comprises the following pertinent information: an application type, a predetermined flow control mechanism of the communications protocol, a Quality of Service (QoS) requirement of the application, and a bandwidth requirement of the application, etc. Because the set of session parameters 90 is included within the initial request #1, link layer scheduler 65 receives all the pertinent information about the communications resource requirement and the traffic pattern of the upper layers. With more details described below, link layer scheduler 65 therefore acquires sufficient knowledge and is able to allocate successive transmission opportunities based on the upper-layer resource requirement and traffic pattern dynamically.

In accordance with one novel aspect, link layer scheduler 65 receives the initial request #1 that contains the set of session parameters 90. Accordingly, link layer scheduler 65 allocates a first transmission opportunity for device A to transfer data to device B in the initial grant #2. In addition, link layer scheduler 65 continues to allocate successive transmission opportunities for device A to transfer more data to device B by transmitting successive grants to device A. The successive transmission opportunities are allocated to device A without receiving successive requests from device A. Rather, the successive transmission opportunities are allocated based on the information included in the session parameter 90. By predicting bandwidth requirements from device A and thereby allocating successive transmission opportunities accordingly, device A is able transfer data to device B without sending out additional requests and then waiting for grants. In addition, the novel link layer scheduling method is able to match upper-layer flow control mechanism and better facilitate access control and coordination in the network.

Figure 6:
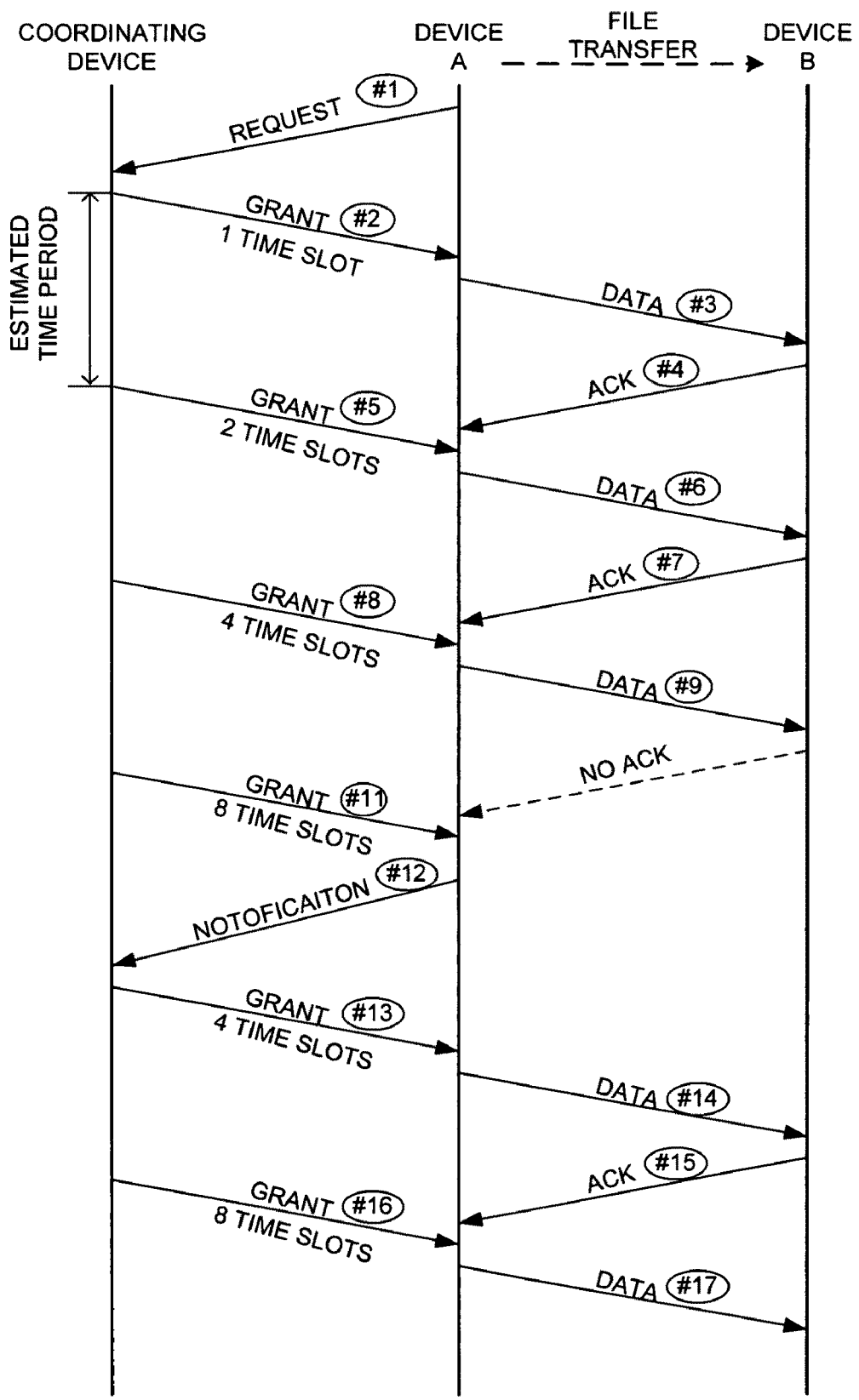
FIG. 6 is a diagram that illustrates an exemplary embodiment of the novel link layer scheduling method of FIG. 5.

FIG. 6 is a diagram that illustrates an exemplary embodiment of the novel link layer scheduling method of FIG. 5. In the example of FIG. 6, the networked application type is an asynchronous communications service such as a file transfer using FTP, which in turn uses TCP as its transport layer protocol. As illustrated in FIG. 6, coordinating device C first allocates one time slot in grant #2 after receiving request #1 for device A to transfer data to device B. After a predetermined time period, coordinating device C allocates two time slots in grant #5 for device A to transfer data to device B. The predetermined time period may be estimated by coordinating device C based on the specific network or the application type. For example, if the average time is approximately one millisecond for device A and Device B to transfer data and to send acknowledgement back during file transfer, then coordinating device C may send out grant #5 one millisecond after it sends out grant #2 because coordinating device C presumes that data #3 transmitted by device A is successfully received by device B (e.g., data #3 is followed by ACK #4). In addition, coordinating device C increases the allocated time slot from one time slot to two time slots because it anticipates a larger bandwidth requirement from device A in accordance with the TCP transport protocol. Similarly, coordinating device C allocates four time slots in grant #8 and allocates eight time slots in grant #11, presuming that data #6 and data #9 transmitted by device A are successfully received by device B (e.g., data #6 is followed by ACK #7). Coordinating device C continues to increase the allocated time slots to match the TCP flow and congestion control mechanism.

In one embodiment, coordinating device C may change the allocation dynamically if it is notified by a network device that network congestion has occurred or certain data has lost during transmission. In the example of FIG. 6, data #9 is lost during transmission. As a result, no acknowledgement is transmitted from device B to device A (e.g., data #9 is followed by NO ACK). After a timeout period, device A sends out a notification #12 to coordinating device C. Notification #12 indicates that a previous transmission of data is unsuccessful. After receiving such notification, coordinating device C reduces the next allocation by allocating four time slots in grant #13 accordingly. If data #14 is transmitted successfully (e.g., followed by ACK #15), then coordinating device C increases the next allocation by allocating eight time slots in grant #16 for device A to transmit data #17 to device B. By adjusting the allocation of transmission time slots dynamically based on network conditions, the novel link layer scheduling method better matches the upper link TCP flow and congestion control mechanism.

In another embodiment, coordinating device C may change the allocation dynamically if it detects that previous allocated times slots are either under-allocated or over-allocated. If coordinating device C under-allocates radio resource (time slots), then device A can sends a message indicating the needs for more time slots to coordinating device C. In response, coordinating device C will increase the number of time slots in the subsequent grants. If, on the other hand, coordinating device C over-allocates radio resource (time slots), then either device A or device B can sends a message indicating the excess time slots to coordinating device C. In response, coordinating device C will decrease the number of time slots in the subsequent grants.

Coordinating device C may also detect the usage of allocated time by monitoring the utilization of the allocated time slot. By comparing the allocated time slots with the actual usage of time slots, Coordinating device C increases or decreases the allocated time slots. By adjusting the allocation of transmission time slots dynamically based on the utilization of previous allocated time slots, system resource can be more efficiently utilized in the network.

Figure 7:
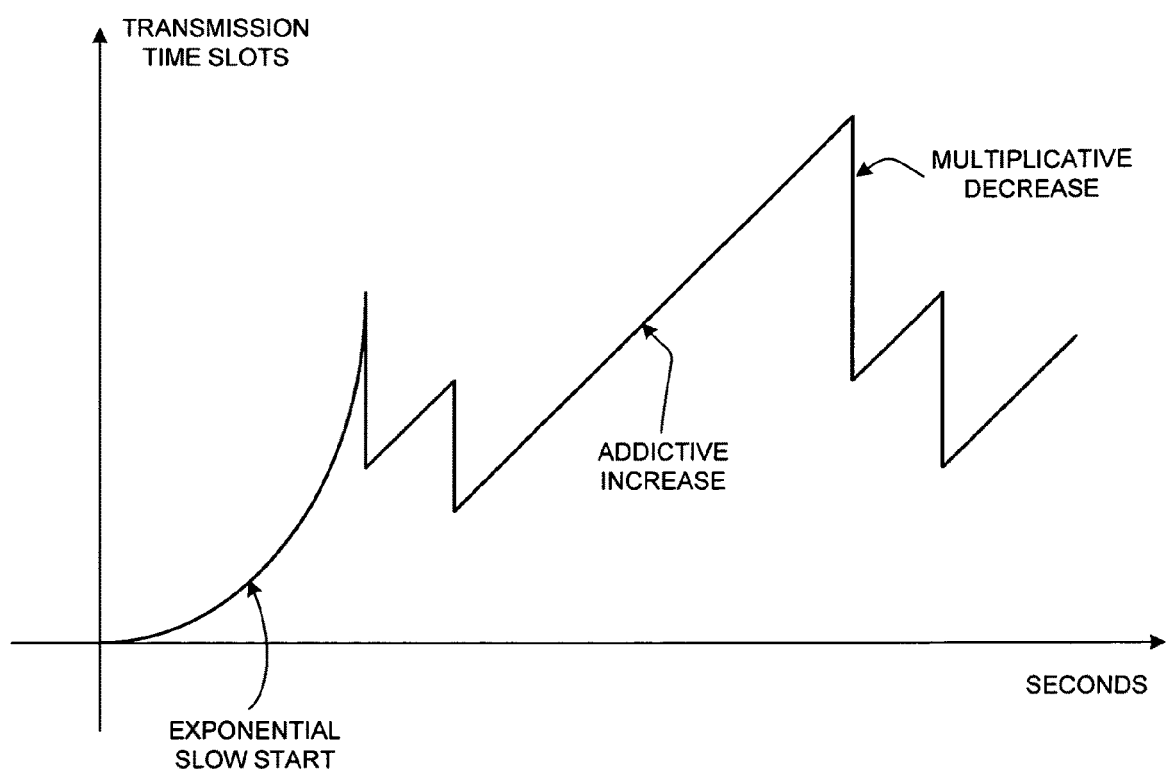
FIG. 7 is a diagram that illustrates an example of link layer scheduling based on TCP Addictive Increase and Multiplicative decrease (AIMD) principle.

FIG. 7 is a diagram that illustrates an example of link layer scheduling based on TCP Addictive Increase and Multiplicative decrease (AIMD) principle. As one of the algorithms to control congestion, TCP uses Slow Start to find initial sending rate and to restart after timeout. TCP also implements an AIMD congestion control mechanism. More specifically, a TCP transmitter linearly (additively) increases the sending rate to probe for available bandwidth when no congestion occurs and decreases its sending rate exponentially (multiplicatively) in response to network congestion indicators (packet losses). However, the TCP AIMD increase-by-one and decrease-by-half strategy is not always effective. The performance of AIMD also depends on the physical layer performance and the link layer scheduling scheme. As illustrated in FIG. 7, the link layer scheduler allocates successive transmission opportunities in accordance with the same TCP AIMD principle. Initially, the link layer scheduler allocates transmission opportunities based on the TCP Slow Start algorithm until a timeout occurred. Afterwards, the link layer scheduler matches the TCP AIMD principle such that it increases the number of transmission time slot by one when no congestion occurs and decreases the number of transmission time slot by half when congestion occurs. As a result, by matching the link layer scheduling scheme to the upper transport layer TCP Slow Start algorithm and TCP AIMD flow control mechanism, the link layer scheduler is able to better estimate the upper layer resource requirement and traffic pattern and allocate transmission opportunities accordingly.

Although the present invention has been described in connection with certain specific embodiments for instructional purposes, the present invention is not limited thereto. For example, coordinator-based network 10 of FIG. 2 may not to be a wireless network. Instead, it can be any wired or wireless network having a link layer coordinator. The notification in FIG. 6 may not be sent from device A. Instead, such notification can be sent by another device in the network. The link layer scheduling of FIG. 7 may not be based on a predetermined flow control mechanism such as the TCP AIMD principle. It can be based on another predetermined control mechanism such as the TCP flow aggregation. In addition, the link layer scheduling can be based on other session parameters such as the bandwidth requirement, the QoS requirement, and other application layer information. Accordingly, various modifications, adaptations, and combinations of various features of the described embodiments can be practiced without departing from the scope of the invention as set forth in the claims.

What is claimed is:

1. A method for scheduling transmission time in a coordinator-based communications system, comprising:
   a) receiving a request from a communications device to establish a communications session over a communications link, wherein the request comprises a set of session parameters;
   b) allocating a first transmission opportunity in response to the request; and
   c) increasing successive transmission opportunities based at least in part the set of the session parameters, wherein the successive transmission opportunities change dynamically in accordance with the set of the session parameters;
   d) decreasing successive transmission opportunities based on a network condition associated with receiving a notification that indicates utilization of previous allocated transmission opportunities.

2. The method of claim 1, wherein bandwidth of the communications link is divided into one or more time slots, wherein each transmission opportunity comprises a number of transmission time slots.

3. The method of claim 1, wherein the set of session parameters comprises at least one of a predetermined flow control mechanism, a quality-of-service (QoS) requirement, a bandwidth requirement, and an application type.

4. The method of claim 3, wherein successive transmission opportunities are increased in accordance with the predetermined flow control mechanism.

5. The method of claim 3, wherein successive transmission opportunities are decreased in accordance with the predetermined flow control mechanism.

6. The method of claim 3, wherein the predetermined flow control mechanism is additive increase and multiplicative decrease (AIMD) of transmission control protocol (TCP).

7. The method of claim 3, wherein the predetermined flow control mechanism is flow aggregation of transmission control protocol (TCP).

8. The method of claim 1, wherein the network condition is associated with detecting utilization of previous allocated transmission opportunities and thereby changing successive transmission opportunities.

9. A link layer coordinating device, comprising:
   a network interface module that receives a request from a communications device to establish a communications session over a communications link, wherein the request comprises a set of session parameters; and
   means for allocating a first transmission opportunity in response to the request, wherein the means is also for increasing successive transmission opportunities based on the set of the session parameters, wherein the successive transmission opportunities change dynamically in accordance with a set of the session parameters, and wherein the successive transmission opportunities decrease based on a network condition associated with receiving a notification that indicates utilization of previous allocated transmission opportunities.

10. The link layer coordinating device of claim 9, wherein bandwidth of the communications link is divided into one or more time slots, wherein each transmission opportunity comprises a number of transmission time slots.

11. The link layer coordinating device of claim 9, wherein the set of session parameters comprises at least one of a predetermined flow control mechanism, a quality-of-service (QoS) requirement, a bandwidth requirement, and an application type.

12. The link layer coordinating device of claim 11, wherein successive transmission opportunities are changed in accordance with the predetermined flow control mechanism.

13. The link layer coordinating device of claim 11, wherein the predetermined flow control mechanism is additive increase and multiplicative decrease (AIMD) of transmission control protocol (TCP).

14. The link layer coordinating device of claim 11, wherein the predetermined flow control mechanism is flow aggregation of transmission control protocol (TCP).

15. The link layer coordinating device of claim 9, wherein the link layer coordinating device detects utilization of previous allocated transmission opportunities and thereby changes successive transmission opportunities.

16. A multiple access communications system, comprising:

a plurality of communications devices, wherein a first communications device initiates a communications session by sending a request, and wherein the request comprises a set of session parameters; and a link layer coordinating device, wherein the link layer coordinating device allocates a first transmission opportunity in response to the request, and wherein the link layer coordinating device increases successive transmission opportunities based on the set of the session parameters, wherein the successive transmission opportunities change dynamically in accordance with a set of the session parameters, and wherein the successive transmission opportunities decrease based on a network condition associated with receiving a notification that indicates utilization of previous allocated transmission opportunities.

17. The multiple access communications system of claim 16, wherein the set of session parameters comprises at least one of a predetermined flow control mechanism, a quality-of-service (QoS) requirement, a bandwidth requirement, and an application type.

18. The multiple access communications system of claim 17, wherein successive transmission opportunities are changed in accordance with the predetermined flow control mechanism.

19. The multiple access communications system of claim 16, wherein the link layer coordinating device detects utilization of previous allocated transmission opportunities and thereby changes successive transmission opportunities.

20. The multiple access communications system of claim 16, wherein the link layer coordinating device is one of the plurality of communications devices.

* * * * *